Patented May 23, 1944

2,349,749

UNITED STATES PATENT OFFICE 2,349,749

ANTIOXIDANT

Philip T. Paul, Naugatuck, Conn., assignor to United States Rubber Company, New York, N. Y., a corporation of New Jersey No Drawing. Application January 29, 1943, Serial No. 473,971

15 Claims. (Cl. 260—809)

This invention relates to a new class of antioxidants or age-resisters for organic substances which tend to deteriorate by absorption of oxygen from the air, e. g., rubber or allied gums, unsaturated fatty oils, such as unsaturated vegetable oils, essential oils, petroleum oils and their derivatives such as gasolines, soaps, aldehydes, synthetic resins, turpentine, insecticides such as derris root, cube root and pyrethrum, and the like. The materials are exceptionally useful as flex-improvers and anti-flex cracking agents for vulcanized rubber, such as tire treads, which undergo repeated strains during use.

According to the invention, the organic substance is incorporated with a chemical having the structure

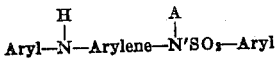

where A is an aliphatic hydrocarbon group; aryl refers to a nucleus of the benzene, naphthalene, or biphenyl series; and arylene refers to an aromatic nucleus containing one or more rings, for example, phenyl, biphenyl, naphthyl, etc. Preferably, the two valences of the arylene nucleus should be attached to the same ring as in 1,4 naphthylene diamine, although compounds in which the valences are attached to discrete rings as in 1,5 naphthylene diamine are within the scope of the invention.

As specific examples of the formula, the following may be given:

N-phenyl N'-methyl N'-benzenesulfonyl p-phenylene diamine;
N-phenyl N'-ethyl N'-benzenesulfonyl p-phenylene diamine;
N-phenyl N'-butyl N'-benzenesulfonyl p-phenylene diamine;
N-phenyl N'-lauryl N'-benzenesulfonyl p-phenylene diamine;
N-phenyl N'-allyl N'-benzenesulfonyl p-phenylene diamine;
N-phenyl N'-methallyl N'-benzenesulfonyl p-phenylene diamine;
N-phenyl N'-cyclohexyl N'-benzenesulfonyl p-phenylene diamine;
N-phenyl N'-benzyl N'-benzenesulfonyl p-phenylene diamine;
N-p-tolyl N'-methyl N'-benzenesulfonyl p-phenylene diamine;
N-p-methoxy phenyl N'-methyl N'-benzenesulfonyl p-phenylene diamine;
N-p-phenoxy phenyl N'-methyl N'-benzenesulfonyl p-phenylene diamine;
N-p-allyloxyphenyl N'-methyl N'-benzenesulfonyl p-phenylene diamine;
N-p-methallyloxy phenyl N'-methyl N'-benzenesulfonyl p-phenylene diamine;
N-p-isopropoxy phenyl N'-methyl N'-benzenesulfonyl p-phenylene diamine;
N-p-isopropenyl phenyl N'-methyl N'-benzenesulfonyl p-phenylene diamine;
N-p-anilino phenyl N'-methyl N'-benzenesulfonyl p-phenylene diamine;
N-phenyl N'-methyl N'-p-toluenesulfonyl p-phenylene diamine;
N-phenyl N'-methyl N'-p-biphenylsulfonyl p-phenylene diamine;
N-phenyl N'-methyl N'-benzenesulfonyl p-tolylene diamine;
N-phenyl N'-methyl N'-benzenesulfonyl 1,4-naphthylene diamine;
N-phenyl N'-methyl N'-benzenesulfonyl benzidine;
N-phenyl N'-methyl N'-benzenesulfonyl 1,5-naphthylene diamine;
N-phenyl N'-methyl N'-benzenesulfonyl o-phenylene diamine;
N-phenyl N'-methyl N'-benzenesulfonyl m-phenylene diamine;
N-phenyl N'-b-hydroxy ethyl N'-benzenesulfonyl p-phenylene diamine;
N-phenyl N'-b-methoxy ethyl N'-benzenesulfonyl p-phenylene diamine;
N-phenyl N'-b-chloro ethyl N'-benzenesulfonyl p-phenylene diamine;
N-phenyl N'-g-dimethylamino N'-benzenesulfonyl p-phenylene diamine.

The N-aryl group may be further substituted in the nucleus, as by alkyl, alkenyl, alkoxy, aryloxy, dialkylamino, anilino, halogen; the arylene nucleus may be further substituted as by alkyl, alkoxy, halogen; the N'-aryl nucleus of the arylsulphonyl group may contain further substituents such as alkyl; and the N'-alkyl radical may be unsubstituted or substituted as by chlorine, alkoxy, or amino groups.

In general these materials may be prepared by treating an acidyl amino diarylamine (Howland U. S. Patent No. 1,907,545) in alkaline solution with an aliphatic halide or sulfate. Although the acidyl amino diarylamines are soluble in alkali due to the enolization of the hydrogen from nitrogen to sulfonyl oxygen

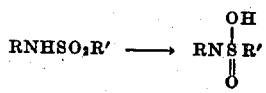

the products of alkylation are believed to be of the structure

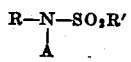

where A is an alkyl group.

The following examples are given to illustrate the invention, the parts are by weight:

EXAMPLE 1

Preparation N-p-tolyl N'-p-toluene sulfonyl N'-methallyl p-phenylene diamine.

Potassium hydroxide (42 grams) was dissolved in 75 cc. water containing 5 grams of sodium hydrosulfite. This was added to a slurry of 88 grams N-p-tolyl N'-p-toluene sulfonyl p-phenylene diamine in 400 cc. ethyl alcohol. The mixture was heated to boiling. With stirring and refluxing 67.8 grams methallyl chloride were added over a one hour period and refluxing was continued for 1½ hours after all the halide had been added. The mixture was cooled to room temperature and poured into 1000 cc. of water containing 10 grams of NaOH. The oil that separated on standing under alcohol crystallized. Recrystallized from alcohol as light gray needles. Yield 55 grams.

Melting point_____ 128–129.5° C.
Sulfur _____ Theory 7.85%; found 8.15%

EXAMPLE 2

Preparation N-p-tolyl N'-methyl N'-p-toluene sulfonyl p-phenylene diamine.

N-p-tolyl N'-p-tolyl sulfonyl p-phenylene diamine (176 grams) was dissolved in a solution of 62 grams KOH in 970 cc. of water. At room temperature 100 cc. methyl sulfate were added slowly and with stirring. The reaction mixture was heated half an hour on the steam bath at the end of the reaction to decompose any unchanged methyl sulfate. The product was obtained as light pink crystals from alcohol.

Melting range_____ 138–139° C.
Sulfur_____ Theory 8.75%; found 8.75%

EXAMPLE 3

Preparation N-p-tolyl N'-ethyl N'-p-tolyl sulfonyl p-phenylene diamine.

N-p-tolyl N'-p-tolyl sulfonyl p-phenylene diamine (88 grams) were dissolved in a solution of 35 grams of KOH and 5 grams of sodium hydrosulfite in 100 cc. of water and 300 cc. of ethyl alcohol. To this solution 61 cc. of ethyl sulfate were added over a 40 minute period. The reaction was very mild and the temperature did not rise above 25° C. As the reaction proceeds, the mixture turns yellow and an oil separates. To decompose any ethyl sulfate, the mixture is heated on a steam bath for half an hour. The oil is separated, washed with water and after crystallization has occurred, it is recrystallized from dilute alcohol. Yield 34 grams.

Melting point_____ 111–114° C.
Sulfur_____ Theory 8.43%; found 8.20%

EXAMPLE 4

Preparation of N-phenyl N'-methyl N'-p-tolyl sulfonyl p-phenylene diamine.

N-phenyl N'-p-tolyl sulfonyl p-phenylene diamine (67 grams) was dissolved in a mixture of 30 grams of KOH, 100 cc. of water and 300 cc. of ethyl alcohol. With vigorous stirring 40 cc. methyl sulfate was run over a ten minute period. The reaction mixture becomes quite warm and stirring was continued for ten minutes after all the methyl sulfate had been added. The reaction mixture was cooled and the crystalline product filtered off.

The product was dissolved in boiling benzene, decolorized with charcoal and crystallized. Yield 24 grams. Colorless crystals.

Melting point_____ 157–158° C.
Nitrogen_____ Theory 7.96%; found 7.91%
Sulfur_____ Theory 9.10%; found 8.85%

In rubber these chemicals behave considerably different than the parent N-aryl N'-aryl sulfonyl phenylene diamines. Their alkaline insolubility prevents any solubility in basic solutions such as are used in latex compounding; the solubility in rubber is increased lessening the danger of a bloom on the rubber surface. The conversion of a secondary amino group to a tertiary amino group ordinarily results in a considerable weakening of antioxidant efficiency. However, in this case, no loss of antioxidant ability occurs and the resistance to flex cracking is improved.

EXAMPLE 5

*Master batch*

| | Parts |
|---|---|
| Pale crepe_____ | 100.0 |
| Zinc oxide_____ | 72.0 |
| Calcium carbonate_____ | 60.0 |
| Lithopone _____ | 60.0 |
| Zinc salt cocoanut oil acids_____ | 0.5 |
| Sulfur_____ | 3.0 |
| Tetramethylthiuram monosulfide____ | 0.15 |

To a portion of this master batch N-p-tolyl N'-methyl N'-p-tolyl sulfonyl p-phenylene was added in the ratio of 1.0 part to 100 parts rubber. Cures were made for 10, 20, and 30 minutes at 30 pounds per square inch steam. Percent remaining tensiles after 72 hours in oxygen are:

| | Control | Antioxidant stock |
|---|---|---|
| Unaged_____ | 100 | 100 |
| Aged_____ | 58 | 75 |

Another rubber mix was made using the above formula. To a portion of this mix N-p-tolyl N'-methallyl N'-p-tolyl sulfonyl p-phenylene diamine was added in the ratio of 1.0 part to 100 parts rubber. Percent remaining tensile after 96 hours in oxygen are:

| | Control | Antioxidant stock |
|---|---|---|
| Unaged_____ | 100 | 100 |
| Aged_____ | Failed | 59 |

Example 6

Master batch

| | Parts |
|---|---|
| Smoked sheet | 100.0 |
| Carbon black | 45.0 |
| Zinc oxide | 5.0 |
| Pine tar | 3.5 |
| Zinc soap cocoanut oil acids | 3.5 |
| Sulfur | 3.0 |
| Mercaptobenzothiazole | 1.0 |

To portions of the above stock N-p-tolyl N'-ethyl N'-p-tolyl sulfonylamino p-phenylene diamine (stock A) and N-phenyl N'-methyl N'-p-tolyl sulfonyl p-phenylene diamine (stock B) were added in the ratio of 1.0 part to 100 parts of rubber. Percent remaining tensile after 96 hours in oxygen are:

| | Control | Antioxidant stock A | Antioxidant stock B |
|---|---|---|---|
| Unaged | 100 | 100 | 100 |
| Aged | 18 | 54 | 44 |

The term "aliphatic" is used broadly herein to mean radicals of the aliphatic series including the polymethylenes, and the term "alkyl" is used broadly herein to refer to saturated or unsaturated radicals having aliphatic characteristics, including aryl-substituted alkyls like benzyl.

The invention may be applied to the preservation of, broadly, natural rubber compositions as well as artificially-prepared rubber compositions, such as polychloroprene, olefine polysulfides, butadiene polymers, modified butadiene polymers (Buna N and Buna S), and including reclaims, and latices of such compositions.

It is also to be understood that other desired filling and compounding ingredients may be incorporated along with the preservative, for example, in the case of rubber, there may be incorporated other accelerators, softeners, etc.

The antioxidant may be incorporated in any type of rubber composition, such as those used for automobile tires and tubes, hose, belting, sheet and thread rubber, rubberized fabrics, molded goods, boots and shoes, etc., whether vulcanized in a mold, in open steam, in hot air, or in the cold by the so-called acid process. The proportion of the antioxidant may vary from about 0.1% to 5%, although either smaller or greater proportions may be found useful. If the material to which it is added is a liquid such as rubber cement or an oil, the antioxidant may be dissolved therein in a suitable small proportion. The antioxidant may be incorporated into solid substances by milling or mastication, and prepared for incorporation into dispersions or solutions either in powder, paste or solution form, or applied in such forms for incorporation by diffusion, to the surface of vulcanized or unvulcanized rubber goods.

Having thus described my invention, what I claim and desire to protect by Letters Patent is:

1. A method of retarding the deterioration of an organic substance which tends to deteriorate by absorption of oxygen from the air which comprises incorporating therein an N-aryl N'-alkyl N'-aryl sulfonyl arylene diamine.

2. A method of retarding the deterioration of an organic substance which tends to deteriorate by absorption of oxygen from the air which comprises incorporating therein an N-aryl N'-alkyl N'-aryl sulfonyl p-phenylene diamine.

3. A method of retarding the deterioration of an organic substance which tends to deteriorate by absorption of oxygen from the air which comprises incorporating therein an N-p-tolyl N'-methyl N'-p-toluene sulfonyl p-phenylene diamine.

4. A method of retarding the deterioration of an organic substance which tends to deteriorate by absorption of oxygen from the air which comprises incorporating therein an N-p-tolyl N'-methallyl N'-p-toluene sulfonyl p-phenylene diamine.

5. A method of retarding the deterioration of an organic substance which tends to deteriorate by absorption of oxygen from the air which comprises incorporating therein an N-phenyl N'-methyl N'-p-toluene sulfonyl p-phenylene diamine.

6. A method of retarding the deterioration of an organic substance which tends to deteriorate by absorption of oxygen from the air which comprises incorporating therein a secondary-tertiary aromatic diamine in which the secondary amino nitrogen atom is separately bonded to an aryl and to an arylene radical, and the tertiary amino nitrogen atom is separately bonded to said arylene radical and also separately bonded to an aliphatic radical as well as to a sulfonyl group of an aryl sulfonyl radical.

7. A method of retarding the deterioration of an organic substance which tends to deteriorate by absorption of oxygen from the air which comprises incorporating therein a chemical having the further structure

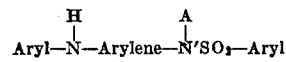

where A is an aliphatic hydrocarbon group; aryl represents an aryl nucleus; and arylene refers to an aromatic nucleus.

8. A method of preserving a rubber composition which comprises incorporating therein an N-aryl N'-alkyl N'-aryl sulfonyl arylene diamine.

9. A method of preserving a rubber composition which comprises incorporating therein an N-aryl N'-alkyl N'-aryl sulfonyl p-phenylene diamine.

10. A method of preserving a rubber composition which comprises incorporating therein a secondary-tertiary aromatic diamine in which the secondary amino nitrogen atom is separately bonded to an aryl and to an arylene radical, and the tertiary amino nitrogen atom is separately bonded to said arylene radical and also separately bonded to an aliphatic radical as well as to a sulfonyl group of an aryl sulfonyl radical.

11. A method of preserving a rubber composition which comprises incorporating therein a chemical having the further structure

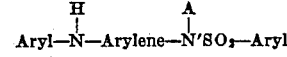

where A is an aliphatic hydrocarbon group; aryl represents an aryl nucleus; and arylene refers to an aromatic nucleus.

12. An organic substance which tends to deteriorate by absorption of oxygen from the air containing an N-aryl N'-alkyl N'-aryl sulfonyl arylene diamine.

13. An organic substance which tends to deteriorate by absorption of oxygen from the air containing an N-aryl N'-alkyl N'-aryl sulfonyl p-phenylene diamine.

14. An organic substance which tends to deteriorate by absorption of oxygen from the air containing a secondary-tertiary aromatic diamine in which the secondary amino nitrogen atom is separately bonded to an aryl and an arylene radical, and the tertiary amino nitrogen atom is separately bonded to said arylene radical and also separately bonded to an aliphatic radical as well as to a sulfonyl group of an aryl sulfonyl radical.

15. An organic substance which tends to deteriorate by absorption of oxygen from the air containing a chemical having the further structure $$\text{Aryl}-\underset{|}{\overset{H}{N}}-\text{Arylene}-\underset{|}{\overset{A}{N'}}\text{SO}_2-\text{Aryl}$$

where A is an aliphatic hydrocarbon group; aryl represents an aryl nucleus; and arylene refers to an aromatic nucleus.

PHILIP T. PAUL